April 3, 1945. B. LICWINKO 2,372,787
WORK HOLDER FOR LATHES
Filed Sept. 29, 1943 2 Sheets-Sheet 1
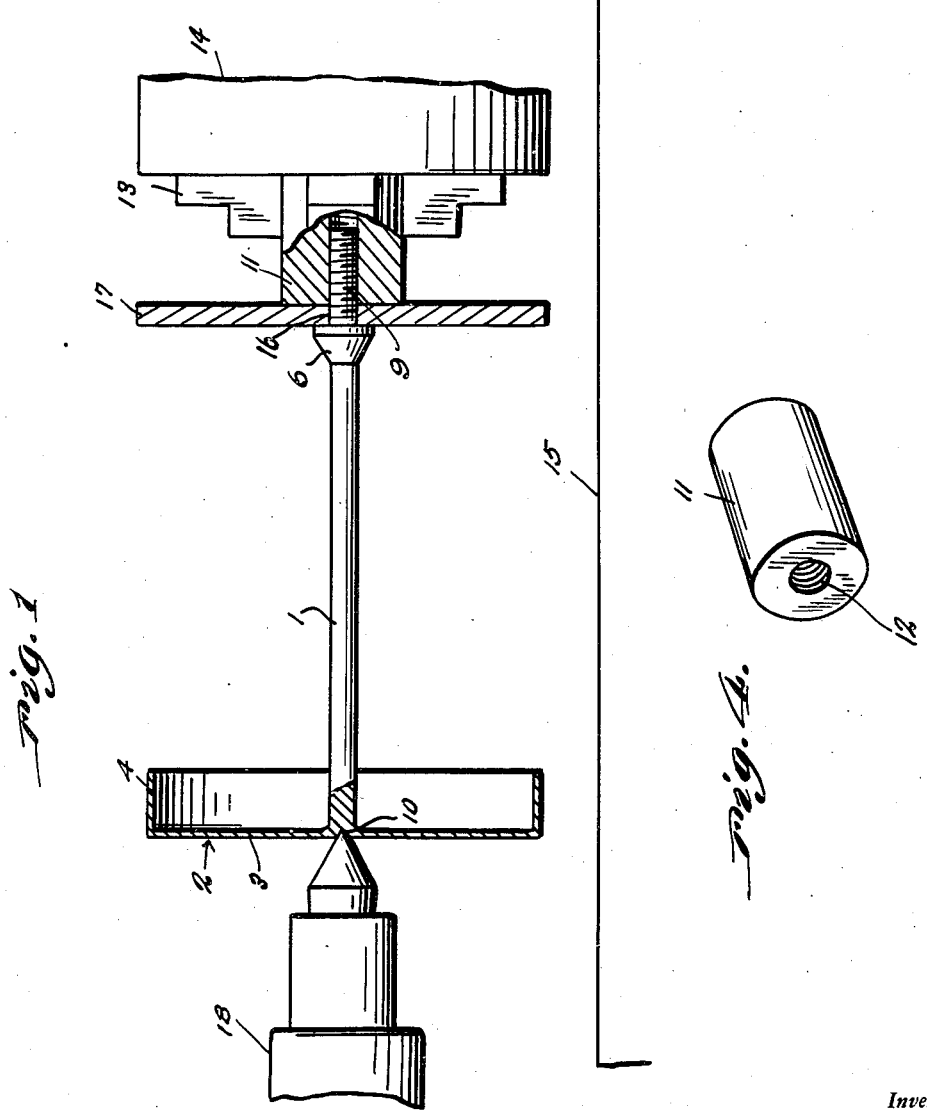
Inventor
Boleslaw Licwinko
By Clarence A. O'Brien
and Harvey B. Jacobson
Attorneys April 3, 1945. B. LICWINKO 2,372,787
WORK HOLDER FOR LATHES
Filed Sept. 29, 1943 2 Sheets-Sheet 2
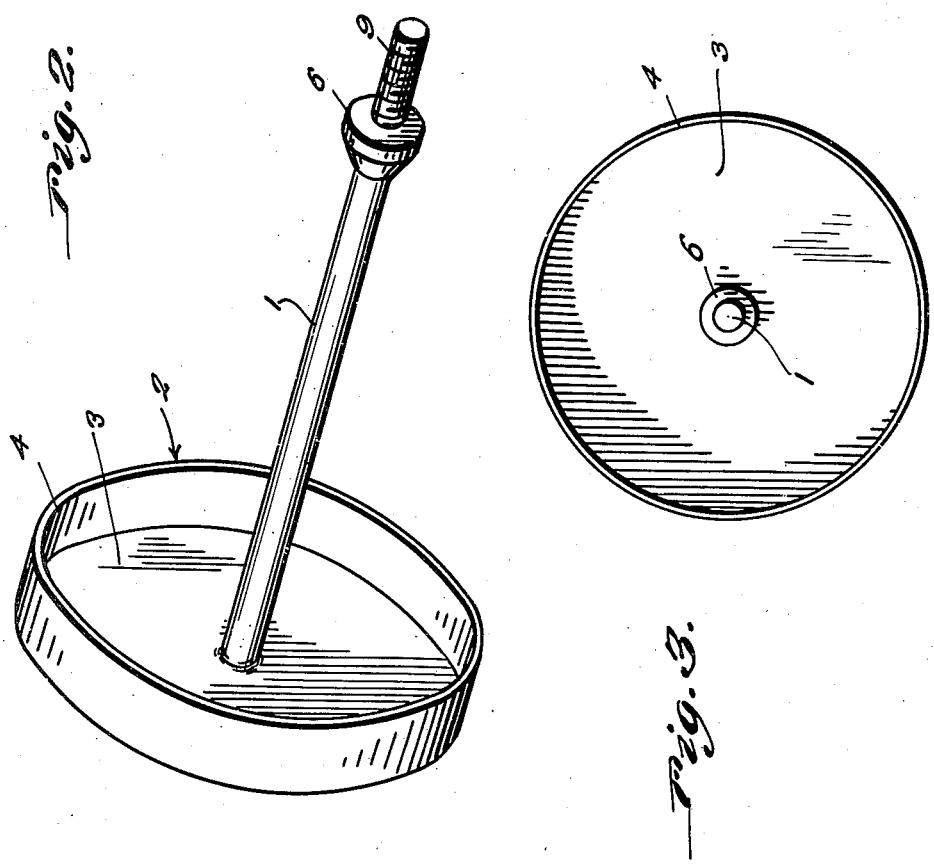
Inventor
Boleslaw Licwinko Patented Apr. 3, 1945

2,372,787

UNITED STATES PATENT OFFICE 2,372,787

WORK HOLDER FOR LATHES

Boleslaw Licwinko, Conshohocken, Pa.

Application September 29, 1943, Serial No. 504,318

1 Claim. (Cl. 82—40)

My invention relates to improvements in work holders for use more particularly, but not necessarily, in lathes when working on steel disks. The principal object of my invention is to provide simply constructed, inexpensive means for mounting said disks on the head stock of a lathe and demounting the same without stopping the lathe, so that the cutting of such disks is materially expedited.

Other and subordinate objects are also comprehended by my invention, all of which, together with the precise nature of my improvements, will be readily understood when the succeeding description and claim are read with reference to the drawings accompanying and forming part of this specification.

In said drawings:

Figure 1 is a view partly in side elevation and partly in longitudinal section of my improved work holder, in its preferred embodiment, applied.

Figure 2 is a perspective view of the mandrel and parts carried thereby.

Figure 3 is a view in end elevation of the same, and

Figure 4 is a view in perspective of the jig.

Referring to the drawings by numerals, according to my invention, a work holder is provided having the form of a mandrel 1 equipped at one end, preferably integrally therewith, with a circular concentric head 2 formed of a flat radial web 3 provided with an annular right angled edge flange 4. The flange 4 provides a hand grip, as will presently more clearly appear. Adjacent the opposite end thereof, the mandrel 1 is provided with a flat faced, circular collar 6 and a terminal section 9 of the mandrel is externally threaded from the collar 6. The web 3 has a conical, axial seat 10 therein. A tubular jig 11, internally threaded, as at 12, is provided, in which the terminal section 9 is designed to be turned.

In the use of the described parts, the jig 11 is clamped in the chuck 13 of the usual head stock 14 of a lathe, the bed of which is represented at 15. The section 9 of the mandrel 1 is inserted through an axial hole 16, provided in the steel disk 17 to be cut. The operator grasping the head 2, by the flange 4, then guides the section 9 into the rotating jig 11 holding said head against rotation so that under rotation of the chuck 13 and jig 11, the section 9 is fed into the jig until the disk 17 is clamped between said jig and the collar 6. The usual tail stock 18 is then fed toward the head 2 to enter the center 19 of of said tail stock in the seat 10. When the disk 17 has been sufficiently cut, or otherwise tooled, the tail stock 18 may be backed off to release the head 2, said head held stationary and the lathe reversed to reverse the chuck 14 and jig 11, so that under reverse rotation of the chuck and jig, the section 9 of the mandrel 1 will be backed out of the jig. The disk 17 may then be removed from the section 9 and another disk substituted.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

A work holder for mounting in a chuck and tail stock of a lathe to support an axially bored disk comprising a tubular internally threaded member for mounting in said chuck, a mandrel having a threaded end section for insertion through the bore of the disk and turning into said member, an enlarged head on the other end of said mandrel forming a hand grip and having a conical seat therein in the axis of the mandrel for receiving the center of the tail stock, and a circumferential collar on said mandrel adjacent the threaded end section for clamping against said disk under turning of said section into said member.

BOLESLAW LICWINKO.